Figure 3:
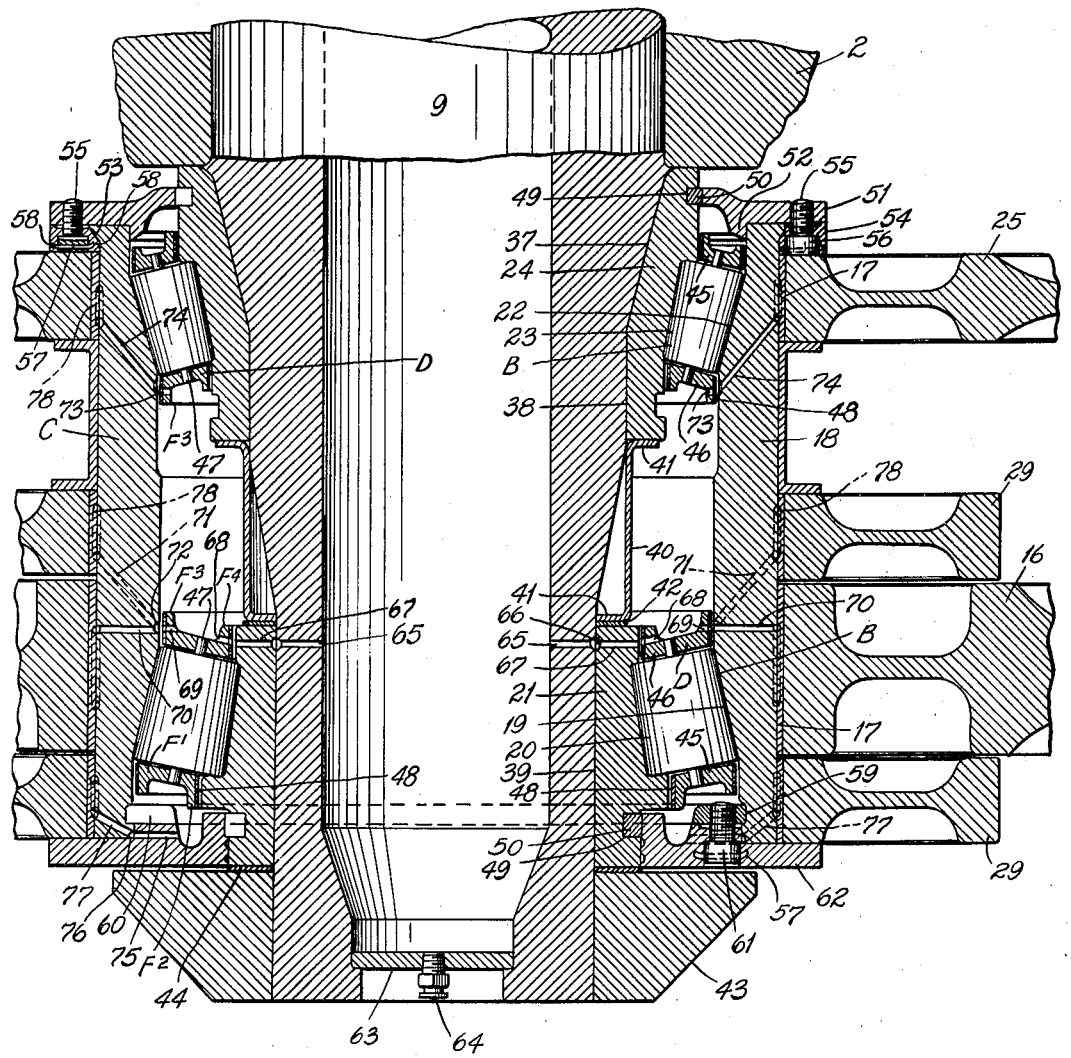

March 13, 1934.　　T. V. BUCKWALTER　　1,951,126
LOCOMOTIVE DRIVE
Filed June 16, 1932　　3 Sheets-Sheet 1
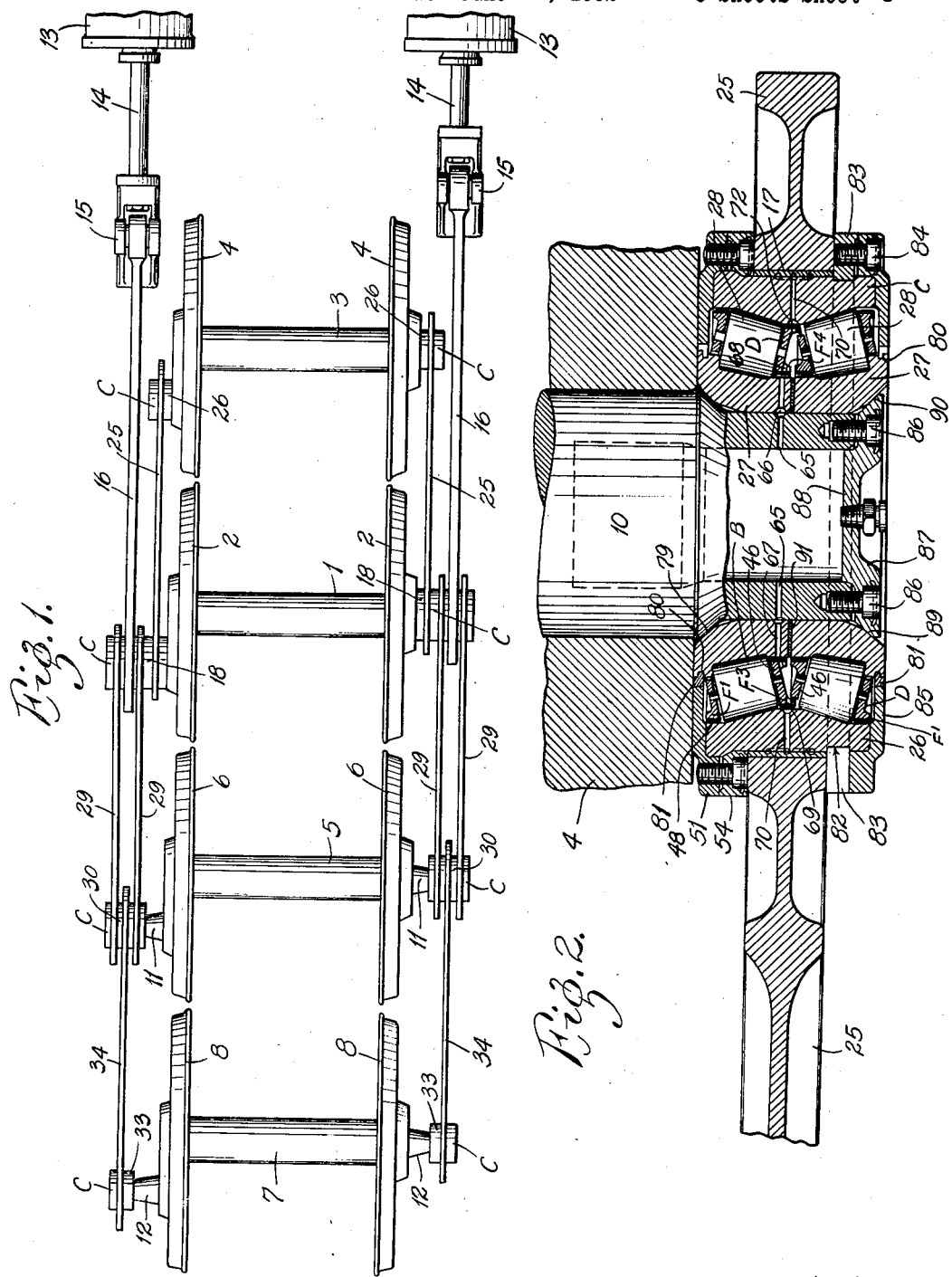
INVENTOR:
Tracy V. Buckwalter
HIS ATTORNEYS.

March 13, 1934.  T. V. BUCKWALTER  1,951,126
LOCOMOTIVE DRIVE
Filed June 16, 1932  3 Sheets-Sheet 2

INVENTOR:
Tracy V. Buckwalter
by [signature]
HIS ATTORNEYS.

March 13, 1934.  T. V. BUCKWALTER  1,951,126
LOCOMOTIVE DRIVE
Filed June 16, 1932  3 Sheets-Sheet 3
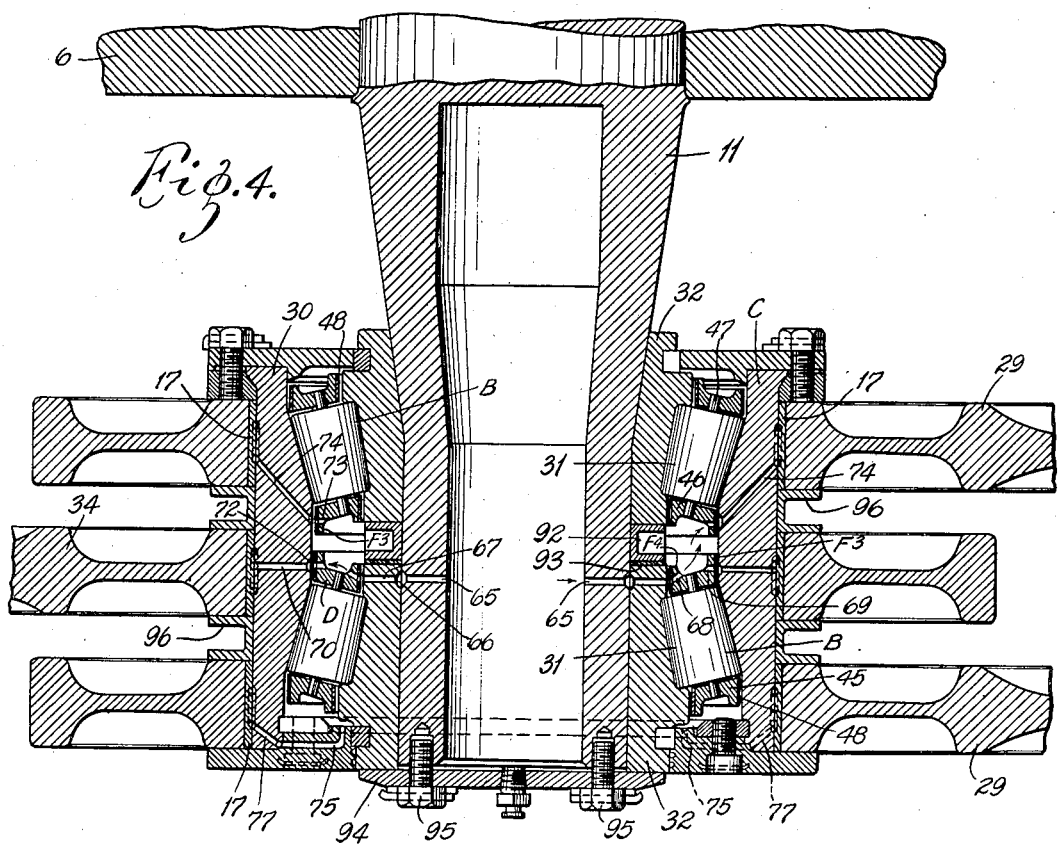
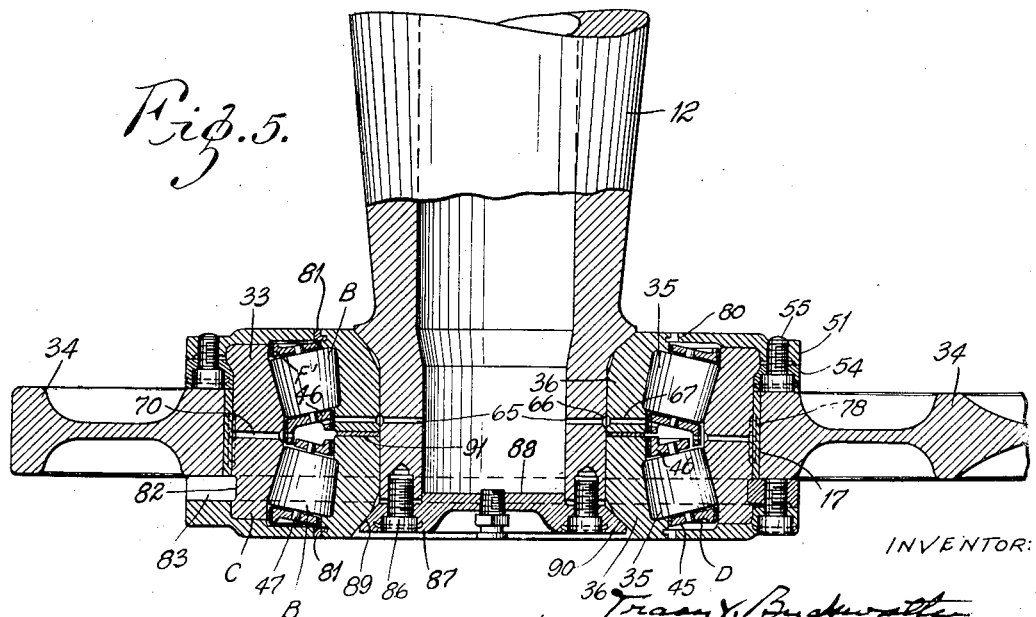
INVENTOR:
Tracy V. Buckwalter
HIS ATTORNEYS Patented Mar. 13, 1934 1,951,126

UNITED STATES PATENT OFFICE 1,951,126

LOCOMOTIVE DRIVE

Tracy V. Buckwalter, Canton, Ohio, assignor to The Timken Roller Bearing Company, Canton, Ohio, a corporation of Ohio Application June 16, 1932, Serial No. 617,573

11 Claims. (Cl. 105—84)

My invention relates to locomotive drive rod constructions and has for its principal objects to simplify the construction, to distribute the load, to reduce the load on the bearings and on the main crank pin, to provide proper lubrication, to accommodate relative movement of the parts without straining or overloading any part, and to decrease the weight of the parts. Other objects and advantages will appear hereinafter.

The invention consists principally in mounting roller bearings on the crank pins, in using the outer bearing members of such roller bearings as hollow pins to be journaled in the drive rods, in using a single outer bearing member on the main crank pin to receive the main drive rod and the side rods and in making the crank pin hollow to contain lubricant for the roller bearings and for the plain bearings of said rods on said outer bearing members. The invention further consists in the locomotive drive and in the parts and combinations and arrangements of parts hereinafter described and claimed.

In the accompanying drawings, wherein like reference characters indicate like parts wherever they occur, Fig. 1 is a plan view of a locomotive drive truck provided with driven means embodying my invention;

Fig. 2 is an enlarged horizontal sectional view of the front crank pin bearing; and Figs. 3, 4 and 5 are similar sectional views of the main, intermediate and rear crank pin bearings, respectively.

In the drawings is illustrated a locomotive drive truck including a main driver axle 1 with its wheels 2, a front driver axle 3 with its wheels 4, an intermediate driver axle 5 with its wheels 6 and a rear driver axle 7 with its wheels 8. Each main driver wheel 2 is provided with a main crank pin 9, each front driver wheel 4 with a crank pin 10, each intermediate driver wheel 6 with a crank pin 11 and each rear driver wheel 8 with a crank pin 12. Each of the crank pins 9, 10, 11, 12 is provided with spaced conical roller bearings indicated generally by B and having a common outer bearing member or cup indicated generally by C.

Extending from the locomotive cylinders 13 on each side of the truck is a piston rod 14 which is connected by a suitable knuckle joint 15 to a main drive rod 16, which extends to the main crank pin 9. The usual transverse bore in the end of the main rod 16 is provided with a suitable plain bearing liner 17 and is loosely mounted on the cup 18 of the main crank pin bearing. Said cup 18 is provided with a conical raceway portion 19 in its bore near its outer end in line with the main rod and conical rollers 20 are mounted on said raceway portion. A cone 21 or inner bearing member for said conical rollers 20 is mounted on said main crank pin 9. Said cup 18 of the main crank pin bearing is provided near its inner end with a conical raceway 22 in which are received conical rollers 23, the cone 24 or inner bearing member therefor being mounted on said crank pin 9.

The end of a front side rod 25 is journaled on the innermost end portion of said main bearing cup 18 over the second series of rollers 23 and its forward end is journaled on the double cup 26 of the double row conical roller bearing B mounted on said front crank pin. Bearing cones 27 are mounted on said front crank pin 10 and conical rollers 28 are interposed between the respective bearing cones 27 and the doubly coned bearing cup 26. Both transverse bores of the front side rod are provided with plain bearing liners 17.

Twin intermediate side rods 29 are journaled at one end on said main bearing cup 18, on either side of the main drive rod 16, and at the other end on the cup 30 of the intermediate crank pin bearing, suitable plain bearing liners 17 being provided for each journal. Said cup 30 has conical raceway portions near each end that receive conical rollers 31 running on the conical race portions of cones 32 mounted on said intermediate crank pin 11.

Journaled at one end on the bearing cup 30 of said intermediate crank pin bearing and at the other end on the bearing cup 33 of the rear crank pin 12 is the rear side rod 34, suitable plain bearing liners 17 being provided for each journal.

The bearing cup 33 of the rear crank pin bearing is provided with conical raceway portions in its ends that receive conical rollers 35 running on the raceways of cones 36 or inner bearing members mounted on the rear crank pin 12. The forward end of said rear side rod 34 is disposed between the ends of the twin intermediate side rods 29.

From the construction so far described, it will be seen that the bearing rollers of the several bearings B are very largely relieved of load, since a considerable portion of the load is transmitted from rod to rod through the several cups C instead of passing through the roller bearings B and through the several crank pins 9, 10, 11, 12. The main crank pin 9, in particular, is relieved of a very large part of the load that is imposed on it in prior constructions.

In addition to the foregoing general arrangement, various details of construction are important and will now be described.

Main crank pin bearing

The innermost bearing cone 24 has a large portion of its bore tapered to fit a tapered seat 37 on the main crank pin 9 and it has a cylindrical portion fitting a cylindrical portion 38 of the crank pin. The outermost bearing cone 21 has a cylindrical bore fitting a cylindrical portion 39 of the crank pin smaller in diameter than the portion 38 on which the innermost bearing cone 24 fits. A spacer sleeve 40 having annular end flanges 41 is interposed between the two bearing cones 21, 24 and adjustment is provided by means of shims 42 interposed between one of said cones and the spacer sleeve 40. Mounted on the outer end of the main crank pin 9 is a positioning and adjusting ring 43 for the outermost bearing cone 21, shims 44 being interposed between said adjusting ring 43 and the outer end of said cone 21.

The cages for the rollers indicated generally by D have large end ring portions 45 and small end ring portions 46 extending parallel to the flat ends of the rollers and connected by longitudinal tie members 47. The large end ring D has a projecting outer flange $F''$ and a projecting inner flange $F^2$ and the small end ring has an outer flange $F^3$ and an inner flange $F^4$. Said flanges may be provided with wear liners 48 to reduce friction between the cage and portions of the cup and cone with which they have a fairly close fit for the purpose of guiding and support.

The innermost bearing cone 24 of the main bearing is provided near its inner end with an annular groove 49 in which is seated a split sealing ring 50. Mounted in the inner end of the main bearing cup 18 is a closure ring 51 having an annular flange 52 extending into the bore of said cup 18 and having its inner periphery fitting snugly on said sealing ring 50. Said bearing cup 18 is provided on its outer surface with a conical rib portion 53 tapering away from the innermost end of said cup. An anchor ring 54 has a conical bore portion seated on said conical rib 53 and is secured to the outer peripheral portion of said closure ring as by headed screws 55. The heads 56 of said screws may be slotted to receive lock wires 57 whose ends 58 are forced into holes provided therefor in the anchor ring.

Said anchor ring 54 prevents the front side rod 25 from slipping off the main bearing cup 18 and takes up any side thrust thereof.

Near its outermost end, said main bearing cup 18 is provided in its inner periphery with an annular groove 59 in which is disposed a split mounting ring 60 provided with a plurality of threaded holes to receive the securing screws 61 of a closure ring 62 mounted at the outer end of said bearing cup 18. Said screws 61 may likewise be held in the closure ring 62 by means of lock wires 57. The inner periphery of said closure ring 62 fits closely on a split sealing ring 50 mounted in a groove 49 in the outer end portion of said bearing cone 21. The outer peripheral portion of said closure ring 62 overlaps the end portion of one of said intermediate side rods 29 to hold it on the bearing cup and to take up any side thrust thereof.

The hollow bore of said main crank pin 9, whose end is closed by a suitable cap 63 having an oil feed fitting 64 therein, contains a supply of lubricant. The pin 9 is provided with a plurality of radially extending holes 65, whose outer ends communicate with an annular groove 66 around the inner periphery of said outermost bearing cone 21. Said bearing cone 21 is provided with radial lubricant passageways 67 communicating with said annular groove 66 and the projecting inner annular flange portion $F^4$ of the small end member of the cage of said outermost bearing is provided with lubricant passageways 68. The annular outer end flange $F^3$ of said small end is also provided with lubricant passageways 69 and the main bearing cup 18 is provided with radial passageways 70 and with angular passageways 71, whose inner ends terminate in alinement with the passageways 69 of said cage. An annular collecting groove 72 may connect the feed ends of said angular passageways 71 and said radial passageways 70 of said cup. The movement of the crank pin causes lubricant to pass outwardly through its radial passageways 65 and through the radial passageways 67 of the bearing cone 21. As the bearing rotates lubricant may pass through the passageways in the inner flange member $F^4$ into the space between the two bearings B and lubricant may also pass through the outer passageways 69 of the cage member into the radial passageways 70 and the angular passageways 71 of the bearing cup. Passageways 73 may also be provided in the outer end flange member $F^3$ of the small end of the bearing cage of the innermost bearing and angular passageways 74 may be provided in the bearing cup to lubricate the bearing for the front side rod 25.

The closure ring 62 also has lubricant passageways 75 therethrough directing lubricant from the outer end of the bearing to the inner periphery of the cup 18, which may have an annular groove 76. Angular passageways 77 in the bearing cup 18 near the outer end convey lubricant to the journal bearing of the intermediate side rod 29, lubricant being fed to these passageways 77 by the passageways 75 of said closure ring. The bearing cup may have in its outer surface suitable grooves 78 communicating with the ends of the various angular passageways and radial passageways of the bearing cup, thus distributing lubricant to the antifriction liners 17 of the several rods, main 16, intermediate 29 and front 25.

*Front pin bearing*

The mounting and lubrication of the front crank pin bearing are generally similar to the main crank pin bearing, but there are some differences in details. The innermost bearing cone 27 of the front crank pin bearing has its bore tapered at the inner end and seated against a conical rib 79 on the crank pin. The bearing cone 27 has an annular groove 80 around its outer periphery in which is mounted a split sealing ring 81. A closure ring 51 and anchor ring 54 similar to those of the main crank pin are provided on the front cup 26.

Said front pin bearing cup 26 has an annular groove 82 around its outer periphery near the outer end thereof in which is disposed a split ring 83 to which is secured, as by screws 84, the closure ring 85 for the outer end of the bearing cup 26, the inner periphery of said closure ring fitting closely around a sealing ring 81 disposed in a groove 80 in the outermost bearing cone.

Secured to the end of the hollow front crank pin 10, as by screws 86, is a closure plate 87 that has a raised portion 88 extending into the bore of the crank pin 10 and fitting closely therein, and that has a conical peripheral portion 89 on its inner face fitting a conical bore 90 provided in the outer end of the outermost bearing cone 27. Said plate 87 constitutes the positioning means for the bearing. Adjusting shims 91 are interposed between the abutting ends of the bearing cones 27.

Only one cage D, illustrated as the innermost, has an inner end flange $F^3$ on its small end ring 46, said flange overlapping the small end ring 46 of the other (illustrated as the outermost) cage.

Again, the cages D of the front pin bearing have only an outer flange F¹ at their large end.

Lubricant is stored in the bore of the hollow crank pin 10 and passes therefrom through radial passageways 65 communicating with an annular groove 66 around the inner periphery of one of said cones 27. Said cones are provided with radial passageways 67 that communicate with passageways 68 provided in the inner end flange F⁴ at the small end of one of the cages. The outer end flange at the small end of said cage is also provided with passageways 69 that communicate with radial passageways 70 in the bearing cup 26, thus feeding lubricant to the surface of said cup for the antifriction liner of the front side rods. An annular connecting groove 72 may be provided around the inner periphery of said cup connecting the feed ends of said cup passageways.

Rear crank pin bearing

The rear crank pin bearing conforms in all details with the construction of the front crank pin bearing.

Intermediate crank pin bearing

The construction of the intermediate crank pin bearing in general follows that of the front and rear crank pin bearings, certain changes in detail being required due to the fact that the intermediate crank pin 11 must be long enough to accommodate the twin intermediate rods 29 and the rear rod 34, whereas the front and rear crank pins have to accommodate only one rod. The innermost bearing cone 32 of the intermediate crank pin bearing is spaced away from the outermost bearing cone by means of a channel-shaped spacer ring 92 and spacer shims 93. The closure plate 94 for the outer end of the bore of the intermediate crank pin 11 contacts flatwise with the flat end face of the outermost bearing cone 32, said closure plate being secured to said crank pin 11 by means of suitable screws 95.

The arrangement of lubricant passageways in this construction resembles that of the main crank pin rather than that of the front and rear crank pins, by reason of the necessity for lubricating three journal bearings. The intermediate crank pins 11 are provided with radial passageways 65 that communicate with an annular groove 66 around the inner periphery of the outermost bearing cone, said bearing cone being provided with radial passageways 67 also communicating with said annular groove 66. The end member of the cage D of the outermost series of rollers is provided with an inner end flange F⁴ through which extend inclined passageways 68, and with an outer end flange F³ through which extend radial passageways 69 communicating with an annular groove 72 around the inner periphery of the bearing cup. Opening into said annular groove are radial passageways 70 that furnish lubricant to the antifriction liner of the rear side rod 34.

The outer annular end flange F³ of the innermost bearing cage is provided with passageways 73 communicating with angular passageways 74 extending to the surface of the bearing cup to provide lubricant for the antifriction liner of the innermost intermediate side rod 29.

At its outer end, said bearing cup 30 is provided with angular passageways 77 to which oil is fed through passageways 75 in the closure ring. Thus lubricant is supplied to the bearing liner of the outermost intermediate side rod 29.

Channel-shaped spacer rings 96 are interposed between the end portion of the rear side rod 34 and the end portions of the intermediate side rods 29.

The above described construction has numerous advantages. By using the bearing cup members after the fashion of knuckle pins and transmitting loads from rod to rod through said pins, the loads on the bearings and on the main crank pin are greatly reduced. This makes it possible to use antifriction bearings on the pins without increasing the weight of the main and side rods.

The use of roller bearings reduces the temperature of the parts when running and permits the use of light weight materials in the rods, such as aluminum alloys and the like which have not been adapted for previous side rod constructions because of the high temperatures under which prior side rod bearings have operated.

The use of roller bearings eliminates the large masses heretofore required at the ends of the rods, thus permitting the rods to be made out of alloy steel and properly heat treated through their length, whereas prior side rod constructions having large masses at the ends could not be properly heat treated throughout their entire length. This uniform action through the length of the side rods also makes possible the reduction in the weight thereof.

The loose fit of the rods on the bearing cups and the mounting of bushings therebetween permits the side rods to accommodate themselves to various defects and off-size conditions and permits relative movement of the several driver axles due to "off-tram" conditions, or to "nosing" of the locomotive or to other conditions, and without overloading the bearings at any point, without producing bending or deflection of any of the side rods and without interfering with the normal relation between the various side rods and crank pins. Thus each axle can follow the irregularities of the rail independently of the other axles. The loose fit permits angular movement of the side rods without overloading the bearings and without changing the load distribution and it avoids the bending and straining of the side rods heretofore required.

The lubricating arrangemen's for the several bearings effectively lubricate all of the parts and result in low operating temperatures. This permits the locomotive to make long runs without stopping for lubrication and greatly increases the life of the bearings and of the rods. The lubrication is accomplished without any oil holes in the rods themselves, thereby reducing the liability of the rods to fracture.

The floating fit of the several bearing cups enables them to accommodate themselves to irregularities and accommodates necessary relative movement and distributes and equalizes the load instead of concentra'ing it at some one point. The bearing cups in normal operation will creep in the side rods thus distributing the wear on the cups.

The construction eliminates knuckle pin joints heretofore required on the front and rear side rods and it also eliminates expensive floa'ing bushing constructions heretofore required on the several crank pins.

Reduction in weight reduces expense, reduces the hammer blow effect and general wear and tear on the rails and makes for smoother running.

Besides the direct saving in weight due to lighter parts, there is the further saving due to smaller counterbalances being required on the wheels.

A considerable saving in power is effected by the combined effect of the several features of construction hereinbefore discussed.

Obviously, the invention is applicable to other types of locomotives than the 8-drive wheel type illustrated and numerous changes in details of construction may be made without departing from the invention; so that I do not wish to be limited to the precise construction shown.

What I claim is:

1. A locomotive drive construction comprising a plurality of driver wheels, each having a crank pin thereon, drive rods extending from crank pin to crank pin and roller bearings on each side of said crank pins having a common outer bearing member, said drive rods having their ends journaled on said outer bearing member.

2. A locomotive drive construction comprising a plurality of driver wheels, each having a crank pin thereon, spaced conical roller bearings on each of said crank pins having a common bearing cup and drive rods extending from crank pin to crank pin and having their ends journaled on said bearing cup.

3. In a locomotive drive construction, a hollow crank pin constituting a lubricant reservoir and having lubricant passageways through its walls, antifriction bearings on said crank pin and a drive rod having its end journaled on the outer bearing member of said bearing, said outer bearing member having passageways through its wall to lubricate the bearing surface of said drive rod.

4. A locomotive wheel crank pin bearing construction comprising a crank pin, an antifriction bearing thereon including an outer bearing member, said outer bearing member having a conical rib around its outer periphery near the end adjacent to the wheel, an anchor ring having a conical inner periphery fitting said rib, a closure ring mounted at the end of said outer bearing member and means securing said anchor ring and said closure ring together.

5. A locomotive wheel crank pin construction comprising a crank pin, an antifriction bearing thereon including an outer bearing member, anchor rings at the ends of said outer bearing member and a drive rod journaled on said crank pin, said anchor ring constituting positioning means therefor.

6. A locomotive wheel crank pin bearing construction comprising a crank pin, an antifriction bearing thereon including an outer bearing member, said outer bearing member having a rib around its outer periphery adjacent to said wheel, an anchor ring on said outer bearing member abutting against said rib, a closure ring at the end of said outer bearing member secured to said anchor ring, said outer bearing member having an annular groove around its inner periphery near the outer end, a split mounting ring therein and a closure ring secured to said mounting ring.

7. A locomotive wheel crank pin construction comprising a crank pin, an antifriction bearing thereon including an outer bearing member, said outer bearing member having a rib around its outer periphery adjacent to said wheel, an anchor ring on said outer bearing member abutting against said rib, a closure ring at the end of said outer bearing member secured to said anchor ring, said outer bearing member having an annular groove around its inner periphery near the outer end, a split mounting ring therein, a closure ring secured to said mounting ring and drive rods journaled on said outer bearing member, one adjacent to said anchor ring and one adjacent to the peripheral portion of said last named closure ring.

8. A locomotive drive construction comprising a plurality of driver wheels each having a crank pin thereon, a main drive rod for actuating the crank pin of one of said wheels, antifriction bearings for each of said crank pins including an outer bearing cup, the end of said main rod being journaled on the bearing cup of said main crank pin, twin intermediate side rods having one end journaled on said bearing cup on each side of said main rod and having their other end journaled on the bearing cup of the crank pin bearing of an adjacent wheel, and a third side rod having one end journaled on said bearing cup and said main crank pin bearing, extending in the opposite direction to said intermediate rods and having its other end journaled on the bearing cup of the crank pin bearing of the adjacent driver wheel.

9. In a locomotive drive construction, a hollow crank pin constituting a lubricant reservoir, spaced bearing cones of taper roller bearings mounted on said crank pin, conical rollers mounted on said bearing cones, cages for said rollers, said cages having inner and outer end flanges at each end, an integral bearing cup having race portions in its ends for the respective rollers and a drive rod having its end journaled on said bearing cup, said crank pin having radial lubricant passageways therethrough, one of said bearing cones having an annular groove around its inner periphery communicating with the discharge ends of said crank pin passageways and also having radial passageways communicating with said annular groove, the inner end flange of the small end of the cage of said last mentioned bearing having lubricant passageways to facilitate the flow of lubricant into the space between the two bearings and said bearing cup having lubricant passageways therethrough to supply lubricant to the bearing surfaces of said drive rod.

10. A locomotive drive construction comprising a plurality of driver wheels each having a hollow crank pin thereon, a main drive rod for actuating the crank pin of one of said wheels, spaced conical roller bearings for each of said crank pins including a common bearing cup, the end of said main rod being journaled on the bearing cup of said main crank pin, twin intermediate side rods having one end journaled on said bearing cup on each side of said main rod and having their other end journaled on the bearing cup of the crank pin bearing of an adjacent wheel, a third side rod having one end journaled on said bearing cup and said main crank pin bearing, extending in the opposite direction to said intermediate rods and having its other end journaled on the bearing cup of the crank pin bearing of the adjacent driver wheel and passageways through which lubricant passes from said hollow pin to said roller bearing and thence to said journals.

11. A bearing assembly comprising a crank pin, bearing cones mounted on said crank pin with their small ends toward each other, said crank pin having an abutment for the innermost of said bearing cones and having means at its outer end for positioning the outermost of said bearing cones, conical rollers on said bearing cones, an integral bearing cup for said two series of rollers, a drive rod journaled on said bearing cup and members secured to the ends of said cup for preventing escape of lubricant, said members having portions serving as retaining and positioning means for said drive rod.

TRACY V. BUCKWALTER.